United States Patent [19]
Lamme

[11] 3,918,764
[45] Nov. 11, 1975

[54] COMBINED LOCK BRACKET AND WHEEL COVER FOR AUTOMOTIVE VEHICLES

[76] Inventor: Robert E. Lamme, 41 E. 19th St., Hialeah, Fla. 33010

[22] Filed: Nov. 1, 1974

[21] Appl. No.: 520,108

[52] U.S. Cl. ............................. 301/37 AT; 70/259
[51] Int. Cl.² .......................................... B60B 7/00
[58] Field of Search ........ 301/37 AT, 37 R, 108 SC, 301/37 CM, 37 SC; 70/169, 259

[56] References Cited
UNITED STATES PATENTS

| | | | |
|---|---|---|---|
| 2,493,366 | 1/1950 | Simcich | 301/37 AT |
| 3,833,266 | 9/1974 | Lamme | 301/37 AT |

*Primary Examiner*—Robert S. Ward, Jr.
*Assistant Examiner*—D. W. Keen
*Attorney, Agent, or Firm*—Salvatore G. Militana

[57] ABSTRACT

A combined lock bracket and wheel cover for automotive vehicles having a barrel lock mounted on the bracket that is provided with bores receiving the wheel lugs for fastening the lock and bracket to the wheel. The wheel cover is provided with a centrally disposed opening for receiving the barrel lock and a latch engaging plate means is mounted on the inner surface of the wheel cover that is adapted to be engaged by the barrel lock latch when the wheel cover is locked into position on the wheel.

3 Claims, 6 Drawing Figures

U.S. Patent  Nov. 11, 1975  Sheet 1 of 2  3,918,764
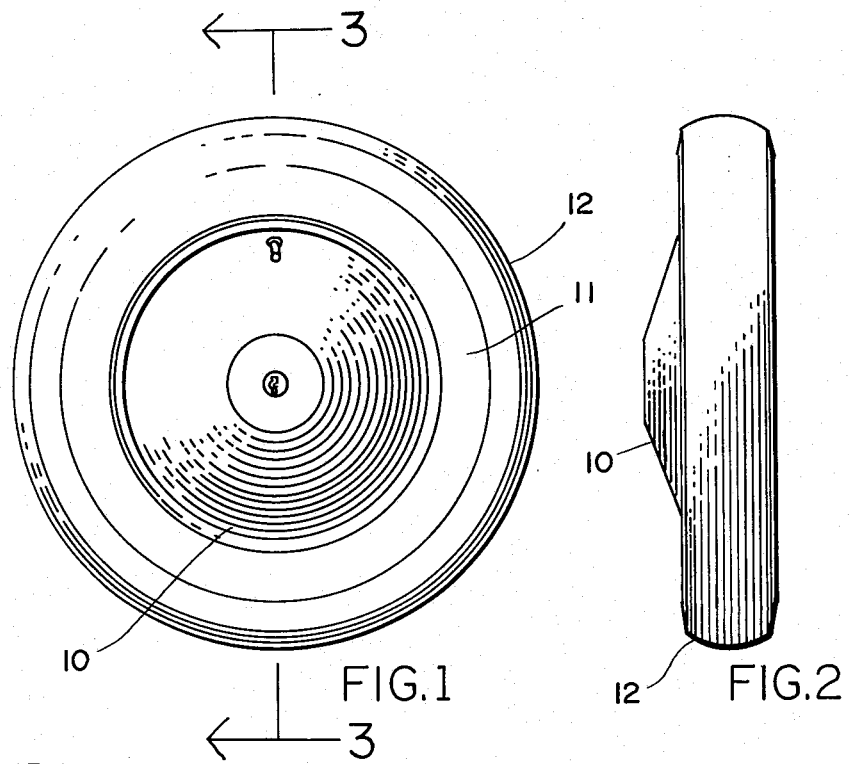
FIG.1
FIG.2
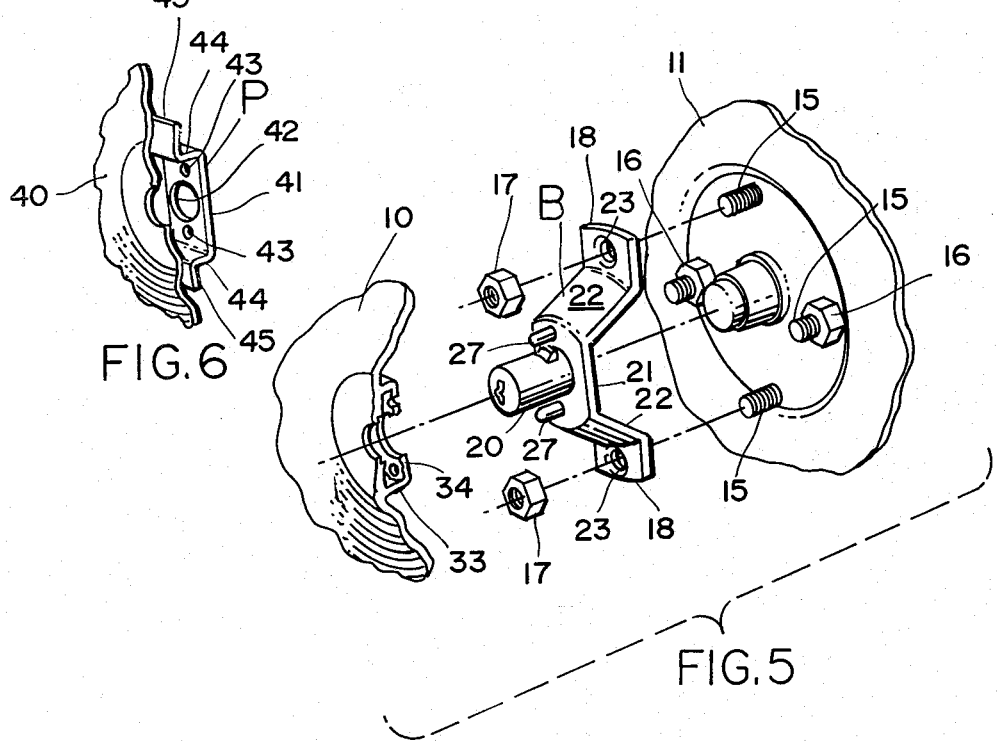
FIG.6
FIG.5

COMBINED LOCK BRACKET AND WHEEL COVER FOR AUTOMOTIVE VEHICLES

CROSS REFERENCES TO RELATED PATENTS

This Invention is an improvement over my prior U.S. Pat. No. 3,170,733 for Wheel Cover With Locking Means, U.S. Pat. No. 3,317,247 for Combined Wheel Cover And Locking Means and U.S. Pat. No. 3,833,266 for Combined Bracket And Lug Nuts For Wheel Covers.

BACKGROUND OF THE INVENTION

1. Field Of The Invention

This invention relates to wheel covers for automotive vehicles and is more particularly directed to wheel covers that can be locked to the wheels of the vehicle.

2. Description Of The Prior Art

As indicated by my prior patents listed hereinabove, the conventional wheel covers that are locked against theft, etc., have a barrel lock or its equivalent mounted on the wheel cover itself. The obvious disadvantages of such an arrangement are that the wheel cover itself becomes more expensive in the long run. The cost may be the same as to whether the lock is mounted on the bracket which is fastened onto the lugs of the wheel or whether the lock is mounted on the wheel cover. However, in the case of having to replace a wheel cover because of theft of the wheel cover or damage thereto by virtue of an accident, the wheel cover having the barrel lock mounted on the wheel cover will obviously cost more than the plain wheel cover. The latter which has the barrel lock mounted on the locking bracket need never be lost or replaced since the bracket is fastened by the lug bolts and nuts to the wheel.

SUMMARY OF THE INVENTION

Therefore, a principle object of the present invention is to provide a wheel cover for automotive vehicles that is secured to a bracket having a barrel locked mounted thereon, the wheel cover having a latch engaging means whereby the wheel cover may be locked to the lock bracket.

Another object of the present invention is to provide a wheel cover with a centrally disposed opening for receiving a barrel lock that is mounted on a bracket, which in turn is secured to the wheel and a latch engaging means mounted on the wheel cover for engagement by the latch of the lock to lock the wheel cover to the wheel.

A still further object of the present invention is to provide a wheel cover that may be locked to a bracket on which a barrel lock is mounted with interengaging members mounted on the wheel cover and the bracket to prevent the rotation of wheel cover with relation to the lock bracket.

With these and other object in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

BRIEF DESCRIPTION OF THE DRAWINGS

In the drawings:

FIG. 1 is a side elevational view of a wheel of an automobile having a wheel cover that is locked to the wheel.

FIG. 2 is a side elevational view.

FIG. 5 is a perspective exploded view of the structure included by FIGS. 3 and 4.

FIG. 6 is a fragmentary perspective view of the wheel cover showing an alternate construction of the lock plate.

DESCRIPTION OF THE PREFERRED EMBODIMENT

Figure 3:
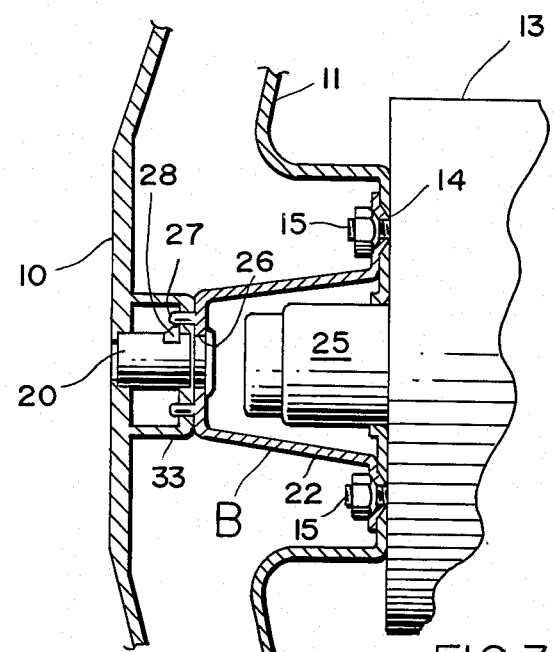
FIG. 3 is a cross sectional view taken along the line 3—3 of FIG. 1.

Referring to the drawings wherein like numerals are used to designate similar parts throughout the several views, the numeral 10 refers to a wheel cover constructed in accordance with my invention having a conventional barrel lock 20 mounted on an arched bracket -B- securing the wheel cover 10 to a conventional wheel 11 on which a tire 12 is mounted. The wheel 11 that is secured in a conventional manner to the brake drum 13 is provided with a plurality of openings 14 through which threaded lugs 15 extend from the brake drum 13. The wheel 11 which is fastened by a plurality of nuts 16, 17 threaded on the lugs 15. While the nuts 16 are threaded on the lugs 15 to directly engage the wheel 11, the nuts 17 that are threaded on the lugs 15 have interposed therebetween flanges 18 that form foot members of the arched lock bracket -B-. The lock bracket -B- consists of a centrally disposed base portion 21 having inclined leg portions 22 extending from the ends of the flat base portion 21 to the flanges or foot members 18. The foot members 18 are each provided with a bore 23 for receiving the threaded lugs 15 with nuts 17 threaded thereon for securing both the bracket -B- and the wheel 11 to the brake drum 13. The bracket -B- is arched in order to accommodate the conventional grease cup 25 mounted on the brake drum 13.

Figure 4:
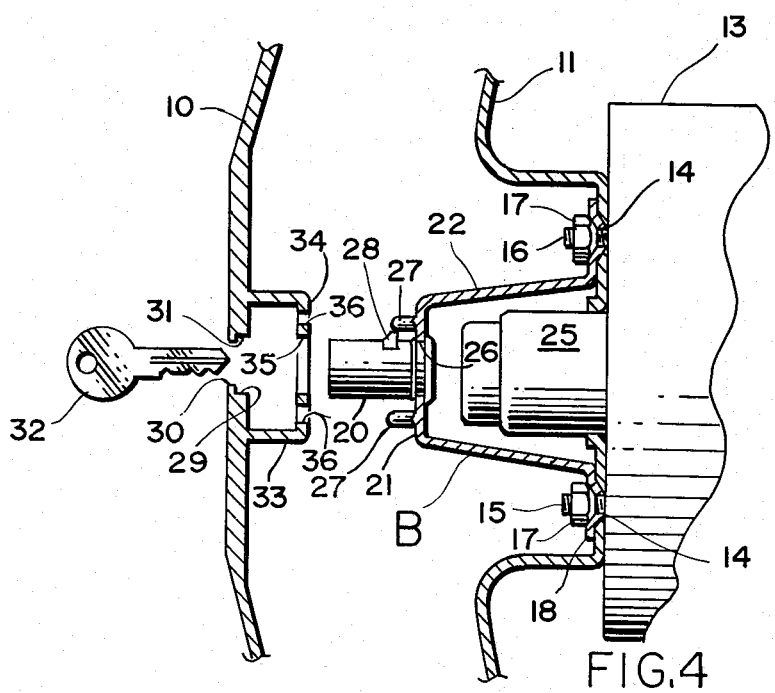
FIG. 4 is a similar view as FIG. 3 with the parts shown in an exploded position.

The base member 21 of the lock bracket -B- is provided with a centrally disposed bore 26 and a pair of pins 27 extending outwardly in the direction toward the wheel cover 10. Secured in the opening or bore 26 in a conventional manner is the barrel type lock 20 having a rectractable latch 28, the lock 20 being received by a centrally disposed opening 29 in the wheel cover. It is to be noted that the opening 29 is stepped inwardly as at 30 to form a shoulder 31 as best shown by FIG. 4 that engages the outer end portion of the barrel lock 20. The opening 30 permits the insertion of a key 32 into the key opening of the barrel lock 20.

Extending inwardly of the wheel cover 10 and symetrically disposed about the opening 30 is a cylindrical wall member 33 with a latch engaging plate member 34 extending across the free end portion of the members 33. The plate member 34 is provided with a centrally disposed opening 35 for receiving the barrel lock 20 and the openings 36 to receive the pins 27. The plate member 34 is so positioned with relation to the shoulder 31 of the opening 29 that when the wheel cover 10 is placed in position on the lock bracket -B- the latch 28 of the lock 20 will engage the inner surface of the plate member 34 and thereby lock the wheel cover 10 to the lock bracket -B- as best shown by FIG. 3. Just as in all conventional wheel covers, the periphery of the wheel cover 10 will frictionally engage the wheel 11 (not shown) so that the wheel cover 10 when locked in position on the wheel 11 will be maintained firmly thereon and my above described locking device will prevent the removal of the wheel cover 10 from the wheel 11 unless the key 32 is first used to unlock the barrel lock 20 to withdraw the latch 28 to its disengages position.

As shown by FIGS. 3-5, the latch engaging plate means 33, 34 is constructed integrally with the wheel cover 10. The alternate construction which is more economical than the above described structure as shown by FIG. 6 provides for manufacturing the wheel cover 40 which is identical in structure with the wheel cover 10 except that the latch engaging plate means -P- is constructed separately of the wheel cover 40 and then welded or otherwise attached to the inner surface of the wheel cover 40. The latch engaging plate means -P- is similar to that described hereinabove and consisting of a rectangular shaped plate member 41 on which openings 42 and 43 are formed similarly to the openings 35 and 36. On opposite edges of the plate member 41 are leg portions 44 extending at right angle thereto with flanges 45 extending outwardly of the free end of the leg portions 44 in parallel relation to the plate member 41. The latch engaging plate means -P- is secured in position to the inner surface of the wheel cover 40 by welding the flanges 45 thereto.

What I claim as new and desire to secure by letters Patent of the United States is:

1. A combined lock bracket and wheel cover for automotive vehicles comprising bracket means having a base member, a plurality of inclined leg portions extending from said base member at substantially an obtuse angle, a flange extending outwardly from the free end of said inclined leg portions, said flanges lying substantially parallel to said base member, bores in said flanges for receiving lugs mounted on said automotive vehicle, said base member having a centrally disposed opening, a barrel lock having a retractable latching mounted in said opening and extending in a direction away from said bracket means, a wheel cover having a centrally disposed opening receiving said barrel lock, means mounted on said wheel cover engaged by said latch when said barrel lock is in a locked position and further means preventing the rotational movement of said wheel cover on said bracket means.

2. The structure as recited by claim 1 wherein said latch engaging means comprises a plate member mounted in spaced relation to said inner surface of said wheel cover, an opening in said plate member in axial alignment with said opening in said wheel cover and receiving said barrel lock whereby said latch engages said plate member to lock said wheel cover to said bracket means.

3. The structure as recited by claim 2 wherein said further means comprises at least one pin mounted on said base member and an opening in said latch engaging plate member receiving said pin whereby said wheel cover is prevented from rotating with relation to said bracket means.

* * * * *